United States Patent
Yang

(10) Patent No.: US 9,020,144 B1
(45) Date of Patent: Apr. 28, 2015

(54) CROSS-DOMAIN PROCESSING FOR NOISE AND ECHO SUPPRESSION

(71) Applicant: Rawles LLC, Wilmington, DE (US)

(72) Inventor: Jun Yang, San Jose, CA (US)

(73) Assignee: Rawles LLC, Wilmington, DE (US)

( * ) Notice: Subject to any disclaimer, the term of this patent is extended or adjusted under 35 U.S.C. 154(b) by 0 days.

(21) Appl. No.: 13/801,714

(22) Filed: Mar. 13, 2013

(51) Int. Cl.
*H04M 9/08* (2006.01)

(52) U.S. Cl.
CPC ..................................... *H04M 9/082* (2013.01)

(58) Field of Classification Search
USPC ............................ 379/406.05, 406.12–406.14
See application file for complete search history.

(56) References Cited

U.S. PATENT DOCUMENTS

| | | | |
|---|---|---|---|
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 8,655,418 B2* | 2/2014 | Barron | 455/570 |
| 2003/0076950 A1* | 4/2003 | Usman et al. | 379/406.08 |
| 2012/0223885 A1 | 9/2012 | Perez | |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Alexander Jamal
(74) *Attorney, Agent, or Firm* — Lee & Hayes, PLLC

(57) ABSTRACT

An audio-based system may perform noise and echo suppression by initially processing an audio signal that is subject to acoustic echo or echo resulting from other system characteristics. The audio signal is processed in the time domain using an adaptive echo-cancellation filter. The audio is then further processed in the frequency domain to simultaneously reduce background noise and residual echo.

19 Claims, 5 Drawing Sheets

CROSS-DOMAIN PROCESSING FOR NOISE AND ECHO SUPPRESSION

BACKGROUND

Acoustic echo cancellation (AEC) is used in telecommunications devices to improve audio quality. In this environment, an echo is a delayed reoccurrence of an original signal in a received or retransmitted signal.

Audio echo may be caused by an acoustic path between the microphone and speaker of a communications device such as a telephone handset. AEC is particularly useful in so-called "hands-free" communications devices, where there is very little acoustic isolation between the microphone and speaker of the device.

AEC is typically performed by recognizing the original audio and subtracting it from the signal in which it reappears as an echo. This function may be performed by an adaptive linear filter, such as an adaptive finite impulse response (FIR) filter. An adaptive filter has weights or coefficients that are dynamically optimized to minimize the presence of echo audio in a signal.

In practice, a residual echo typically remains after application of an adaptive filter. This may be due to insufficient length of the adaptive filter, non-linearities in the acoustic echo path, and/or imperfections in echo modeling. Additional filtering and/or processing may therefore be performed in certain situations to reduce residual echo.

Audio signals may also be processed to reduce noise, which may include environmental background audio as well as noise introduced by telecommunications devices and systems themselves.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are techniques for reducing noise and undesired echo in an audio signal. Undesired echo may be due to acoustic feedback paths and/or other characteristics of a communications infrastructure.

In certain embodiments described herein, the undesired echo is estimated using an adaptive filter such as an adaptive finite impulse response (FIR) filter, and subtracted from the audio signal. The audio signal is then processed in the frequency domain to reduce noise and to further reduce any residual echo that may remain after the adaptive filter processing.

Figure 1:
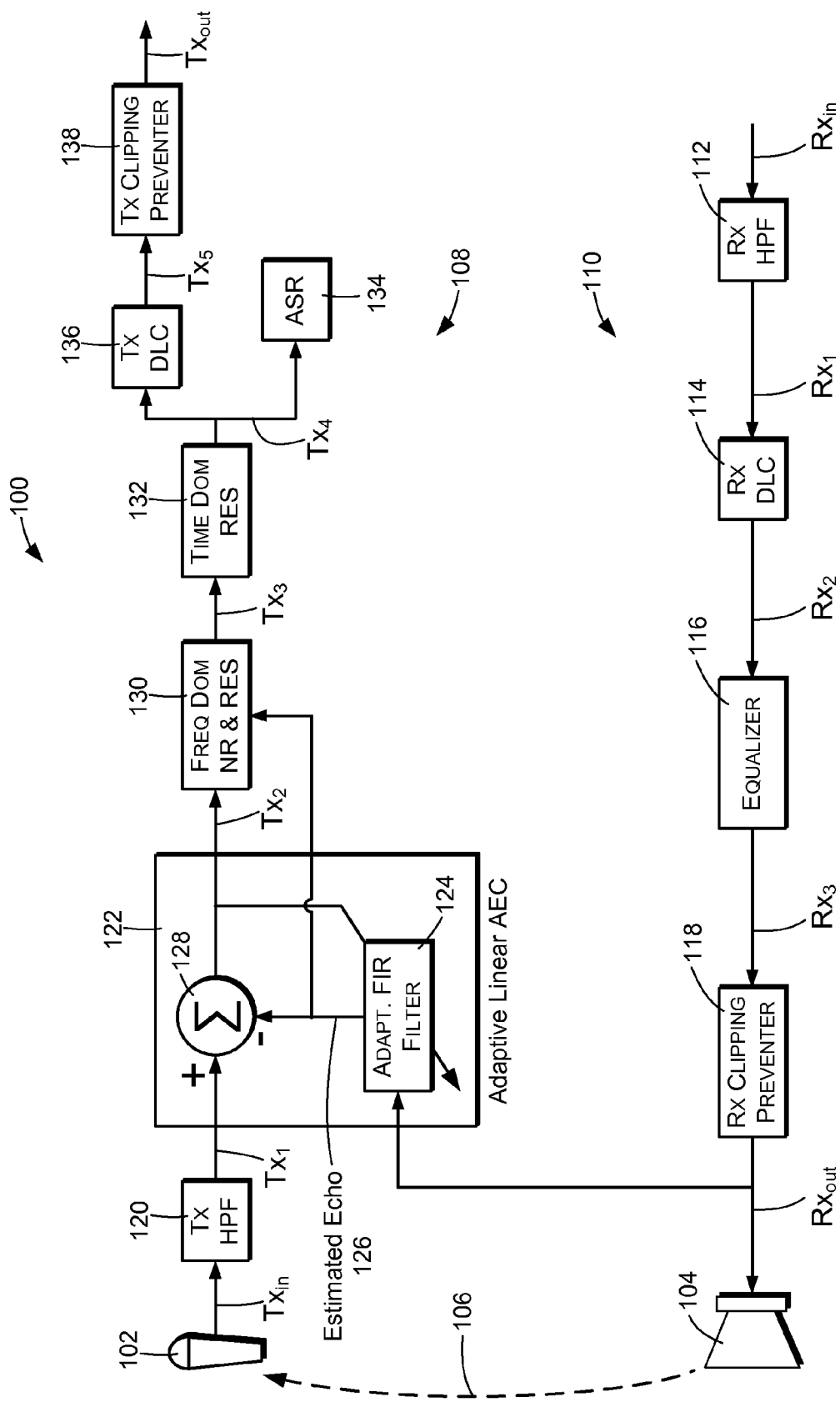
FIG. 1 is a block diagram illustrating actions performed by an audio processing device to reduce acoustic echo and noise.

The frequency-domain processing comprises calculating frequency domain power spectral densities (PSDs) representing the audio signal, background noise contained in the audio signal, and undesired echo contained in the audio signal. A frequency domain spectral gain is calculated based on one or more of the frequency domain PSDs. The spectral gain calculation may also be based in part on the nature of the estimated echo, such as whether the echo represents far-end audio and/or near-end audio FIG. 1 shows an example communications or audio device 100 having an audio microphone 102 and an audio speaker 104 that are coupled by an acoustic path 106. FIG. 1 illustrates an example process that may be used within the audio device 100 to reduce or suppress echo components, such as may be caused by acoustic coupling or electrical coupling, in the signal paths of the audio device 100.

The audio device 100 may comprise a hands-free communications terminal or device configured to be located within an environment such as a building or room. The audio device 100 may capture the voice of a user through the microphone 102 for use by a communications device and/or for transmission to far-end devices, systems, or users. The audio device 100 may also generate audio for the user through the speaker 104.

More specifically, the audio device 100 may act as a near-end audio input/output device for a telephone, cellular phone, or other communications device. In other cases, the audio device may be used for voice interaction with a computerized system or device. For example, a user may speak commands that are relayed and acted upon by an automated system or service. Such an automated system or service may also generate audio for rendering by the audio device 100. Rendered audio may include synthesized voice communications, music, and/or other type of audio.

Physically, the audio device 100 may comprise a free-standing device for placement on a table or in another location within a room or other environment. Alternatively, the audio device 100 may comprise a headset such as might be placed over the ear of a user for use with a telecommunications device or other system. In some situations, the audio device 100 may be part of a larger system, such as a video conferencing system or other telecommunications system.

In operation, the voice of a user is captured by the audio microphone 102. The resulting audio input signal Tx, also referred to herein as transmission signal Tx, is processed in a transmit path 108 and transmitted to a system, device, or component. Similarly, the audio device 100 receives a reception signal Rx, also referred to herein as an output audio signal Rx, from a system, device, or component, and processes the output signal Rx in a receive path 110 for rendering on the audio speaker 104.

The audio signals shown and discussed herein may comprise analog signals and/or may comprise continuous sequences of sampled digital amplitude values. For example, audio received from the microphone 102 may be evaluated in the time domain at a predetermined sampling rate to produce sampled amplitude values. In addition, time domain audio signals may be converted to frequency domain signals or values for certain types of processing and filtering that will be discussed below.

The functionality illustrated by FIG. 1 may be implemented by various types of logic, including digital processors, signal processors, or similar types of devices that perform operations based on instructions and/or programs stored in associated memory. In other embodiments, the described functionality may be performed by other means, which may include non-programmable elements such as analog components, discrete logic elements, and so forth. Thus, the various functional elements shown in FIG. 1 may comprise discrete functional elements, and/or may represent steps or actions that are performed by the device 100.

A device or system such as shown by FIG. 1 may be subject to echoing based on combinations of audio received by device 100 from external communication components and from the microphone 102 "Near-end audio" refers to sound picked up by the microphone 102, including a user voice, background or environmental noise, and reverberations of the user voice. Near-end audio may also include audio received by the microphone array 102 from the speaker 104. Near-end audio is often referred to as near-end "talk," particularly in voice communication systems.

"Far-end audio" refers to sound generated by a user or device that is remote to the local device (e.g., external to the device 100). A remote or far-end device may comprise a remote telecommunications component or any other source of an audio signal that is received by the device 100 for rendering on the speaker 104. Far-end audio may comprise music, speech, etc. In two-way telecommunications environments, the far-end audio may comprise the voice of a remote user, which is to be rendered locally by the speaker 104. Far-end audio is often referred to as far-end "talk," particularly in voice communications systems.

Echoing can be caused by near-end conditions or factors, such as by acoustic and/or electrical coupling between the speaker 104 and the microphone 102. Similar conditions at the far end may similarly result in undesired echoing. Undesired echo components within an audio signal may thus comprise near-end audio, far-end audio, or both.

The term "single-talk" refers to a situation in which an audio signal contains either near-end or far-end audio. The term "double-talk" refers to a situation in which an audio signal contains both near-end and far-end audio.

In the embodiment of FIG. 1, the receive path 110 includes a high-pass filter (HPF) 112 that performs high-pass filtering with respect to the output audio signal Rx. More specifically, the HPF 112 receives an audio signal $Rx_{in}$ and filters out any DC component. In addition, the HPF 112 may be used to filter out low frequency noise from the received audio signal $Rx_{in}$. For wideband speech applications, a cut-off frequency of 60 Hertz may be used in the HPF 112. For use in other environments, such as Digital Enhanced Cordless Telecommunications (DECT) systems, a cut-off frequency of 100 Hertz may be more suitable. As an example, the HPF 112 may comprise a second-order high-pass filter. The filtered audio signal is referred to in FIG. 1 as a $Rx_1$.

The receive path 110 also includes a dynamic level controller 114 that performs dynamic level control (DLC), which is sometimes also referred to as automatic gain control (AGC). The dynamic level controller 114 receives the signal $Rx_1$ from the HPF 112 and amplifies or compresses the signal to achieve desired audio output levels. The output of the dynamic level controller 114 is referred to in FIG. 1 as $Rx_2$.

The receive path 110 also includes an equalizer 116 that performs equalization of the output audio signal Rx to compensate for audio speakers having poor frequency responses. The equalizer 116 receives $Rx_2$ from the DLC 114. The output of the equalizer 116 is referred to in FIG. 1 as $Rx_3$.

The receive path 110 further includes a clipping preventer 118 that is configured to attenuate peaks of the output audio signal Rx that might otherwise cause clipping of audio rendered on the speaker 104. The clipping preventer receives $Rx_3$ from the equalizer 116. The output of the clipping preventer 118 is referred to in FIG. 1 as $Rx_{out}$. Clipping prevention helps avoid non-linear echoing and speaker distortion in the input audio signal Rx.

The speaker 104 is driven in response to $Rx_{out}$, at the end of the receive path 110. The receive path 110 may include other components, not shown, such as amplifiers, other types of filters, and so forth.

The transmit path 108 includes a high-pass filter (HPF) 120 that is configured to filter out any DC component of the input audio signal Tx as well to filter out as some low frequency noise. The HPF 120 receives the input audio signal, referred to at this point as $Tx_{in}$, from the microphone 102. The filtered input audio signal is referred to in FIG. 1 as $Tx_1$. The HPF 120 may be configured similarly to the HPF 112 of the receive path 110.

The input audio signal $Tx_1$ is provided to an adaptive linear acoustic echo cancellation (AEC) component 122, which performs adaptive filtering of the input audio signal Tx to accomplish initial echo suppression. The adaptive linear AEC component 122 may be implemented in either the time domain or the frequency domain. The following discussion assumes that the AEC component 122 is implemented in the time domain.

The adaptive linear AEC component 122 may comprise a time-domain adaptive filter, such as an adaptive finite impulse response (FIR) filter 124, which estimates an undesired echo component that may be present in the filtered input audio signal $Tx_1$. More specifically, the adaptive FIR filter 124 is responsive to the output audio signal $Rx_{out}$ to calculate an estimated echo signal 126, which represents an approximation of echo resulting from audio rendered by the speaker 104. The estimated echo signal 126 is subtracted from the filtered input audio signal $Tx_1$ at 128 to produce a first echo-suppressed input audio signal $Tx_2$. The subtraction 128 comprises subtracting the current amplitude of the estimated echo component 126 from the current amplitude of the filtered input audio signal $Tx_1$.

The adaptive FIR filter 124 estimates undesired echo by repeatedly updating a sequence of weights and applying the weights respectively to a sequence of most recently received values of the receive path signal $Rx_{out}$. The adaptive FIR filter 124 calculates and updates the weights so as to continuously and adaptively minimize the signal power of the first echo-suppressed input audio signal $Tx_2$ (which is referred to as the "error" signal in the context of adaptive filtering).

More specifically, the adaptive FIR filter 124 receives the receive path signal $Rx_{out}$, which comprises sequential amplitude values of the receive path that are used to drive the speaker 104. The FIR filter 124 maintains a sequential set of filter coefficients, referred to as weights, that are applied respectively to a corresponding sequence of recently received amplitude values of the receive path signal $Rx_{out}$. A weight is applied to a corresponding value by multiplying the value by the weight. The adaptive FIR filter 124 continuously evaluates the signal power of the first echo-suppressed input audio signal $Tx_2$, and dynamically optimizes the weights so that the signal power of the first echo-suppressed input audio signal $Tx_2$ is minimized. The optimization of the weights may be performed using a normalized least mean square algorithm or a total least square algorithm.

The first echo-suppressed input audio signal $Tx_2$ may have residual echo, in spite of the adaptive linear filtering. In order to reduce such residual echo, the transmit path includes a frequency-domain, non-linear filter 130 that is configured to filter the echo-suppressed signal $Tx_2$ in the frequency domain to simultaneously reduce or remove both noise and remaining residual echo, and to produce a time-domain audio signal with reduced noise and echo.

The frequency-domain filter 130 is responsive to the estimated echo signal 126 and to the first echo-suppressed input audio signal $Tx_2$ to produce a second echo-suppressed input audio signal $Tx_3$, from which noise and residual echo have been reduced or removed. Further details regarding the frequency-domain filter 130 will be described below with reference to FIG. 2.

The second echo-suppressed input audio signal $Tx_3$ may be processed by a time-domain residual echo suppression (RES) component 132 to remove further components of residual echo. The time-domain RES component 132 can be implemented by post-filtering techniques. In certain embodiments, for example, a post-filter may be dynamically adjusted in response to whether the estimated echo represents far-end single-talk audio or double-talk audio. More specifically, the post-filter may be configured to act as an all-pass filter when there is no near-end audio, and to act as a band-stop filter when near-end audio is present. The band-stop filter may be configured to reduce components in a frequency band corresponding to the far-end single-talk audio.

The output of the time-domain RES component 132, indicated in FIG. 1 as $Tx_4$, may be provided to systems or components that utilize the transmit signal. As an example, the $Tx_4$ signal may be provided to an automatic speech recognition (ASR) component 134 of an automation system or other application. Alternatively, or in addition, the $Tx_4$ signal may be subject to further filtering, such as by a DLC component 136, which produces an input audio signal $Tx_5$, and a clipping preventer 138 that produces an input audio signal $Tx_{out}$.

Figure 2:
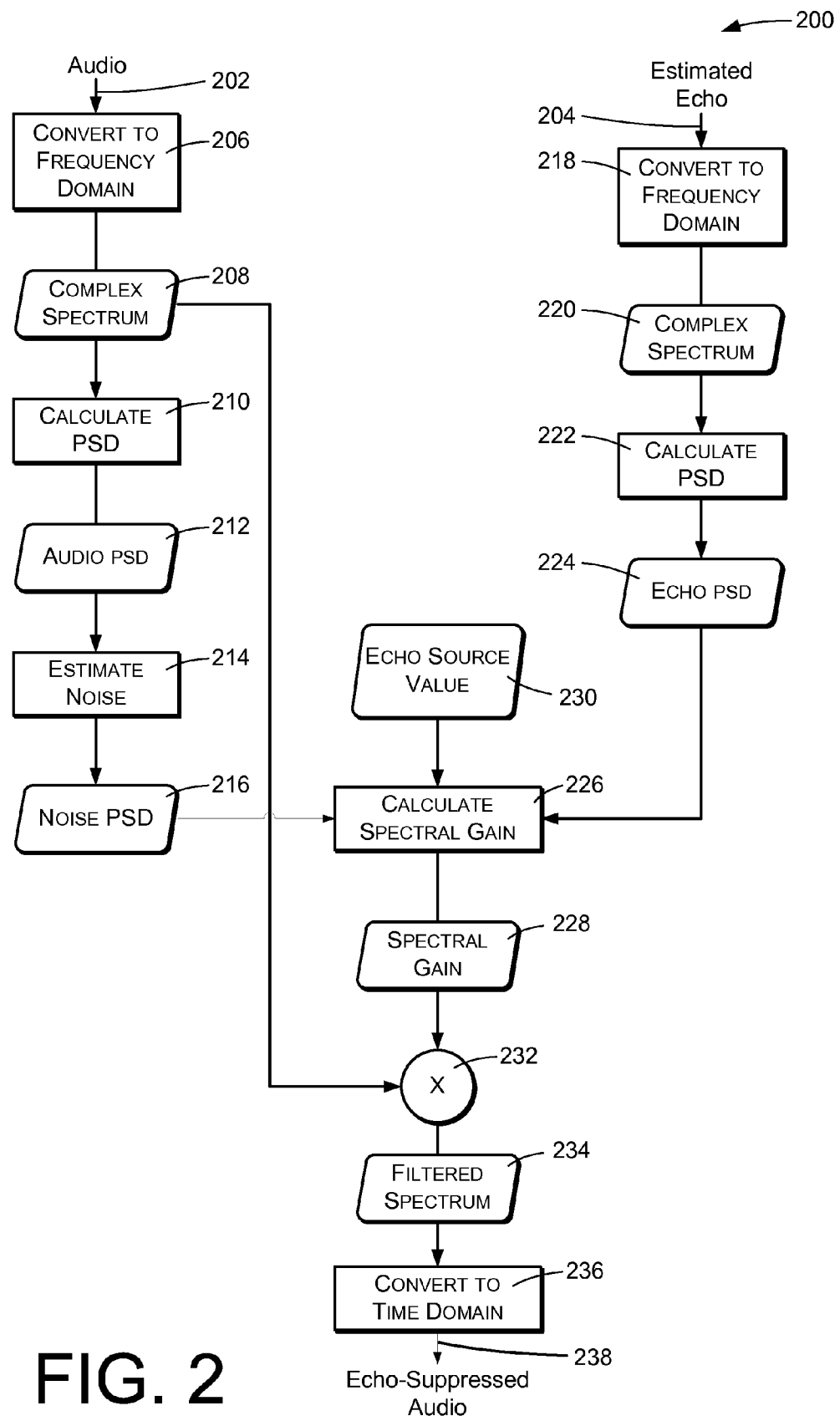
FIG. 2 is a flowchart illustrating simultaneous noise and echo reduction as may be performed in conjunction with the actions shown in FIG. 1.

FIG. 2 illustrates a process or technique 200 of filtering an audio signal having undesired echo. The process 200 is performed in the frequency domain to simultaneously reduce noise and undesired echo in the audio signal. In the environment of FIG. 1, the process 200 may be implemented by the frequency-domain filter 130.

The process 200 acts with respect to a time-domain audio signal 202 that may contain an audio echo component, such as may be produced by residual echo remaining after the processing of the linear adaptive AEC component 122. The echo component may be the results of double talk and/or far-end single talk.

The audio signal 202 may also contain noise, which may be due to environmental conditions or may be introduced by components of a communications infrastructure. In the environment described herein, the audio signal 202 may correspond to the first echo-suppressed transmit signal $Tx_2$.

Portions of the process 200 utilize an estimated echo signal 204 containing an indication of estimated echo audio in the audio signal 202. In the environment described herein, the estimated echo signal 204 corresponds to the estimated echo signal 126 of FIG. 1.

An action 206 comprises converting the time-domain audio signal 202 to the frequency domain by calculating a frequency-domain representation of the audio signal 202. This may comprise receiving input samples of the audio signal 202, arranging the input samples in frames, and calculating a complex signal frequency spectrum 208 for each frame. The signal frequency spectrum 208 may be calculated using overlapping, Hanning windowing, and a fast Fourier transform (FFT). Each complex signal frequency spectrum 208 indicates real and imaginary signal components. Each signal frequency spectrum 208 has amplitude values corresponding respectively to multiple discrete frequencies, which are referred to as frequency bins in the context of FFT.

In some cases, frames may be composed so that they contain overlapping sequences of audio samples. That is, a portion of one frame and a portion of an immediately subsequent frame may have samples corresponding to the same period of time. In certain situations, a portion of a frame may be padded with zero values to produce a number of values equal to the desired frame size.

An action 210 comprises calculating an audio power spectral density (PSD) 212 based on the signal frequency spectrum 208. The audio PSD 212 corresponding to a particular frame of input samples indicates the energy or power exhibited by the frame for each of a plurality of frequencies or frequency values. Thus, the audio PSD 212 comprises a value for each of multiple frequencies or frequency bins, based on the signal frequency spectrum 208. Power for an individual frequency may be calculated as $I^2+R^2$, where I is the imaginary (phase-related) part of the signal frequency spectrum 208 at the corresponding frequency and R is the real (amplitude-related) part of the signal frequency spectrum 208 at the corresponding frequency.

The frequencies at which the power values are calculated correspond to the frequency bins of the signal frequency spectrum 208. Alternatively, the audio PSD 212 may be converted so that each of its frequency values corresponds to a range of frequencies or FFT frequency bins, which may be referred to as frequency bands. Partitioning frequency bins into frequency bands can greatly reduce computational complexity and memory usage.

An action 214 comprises estimating spectral noise of the audio signal 202, based on the signal frequency spectrum 208. Spectral noise is indicated by noise values corresponding to individual frequencies of a frequency spectrum, such as the frequencies or frequency bands of the audio PSD 212. More specifically, the action 214 comprises estimating a noise PSD 216 based on the audio PSD 212. The noise PSD 216 indicates an estimated noise value for each of the multiple frequency values or bands of the audio PSD 212. The action 214 may be performed by analyzing a plurality of the most recent audio PSDs 212 to find the lowest represented power value at each of the frequency values. For example, all of the power values corresponding to a particular frequency value (from a plurality of recent audio PSDs 212), may be compared to find the lowest of those power values. This is repeated for each of the frequency values, to find a spectrum of noise values across the frequency values. These noise values form the noise spectrum or PSD 216.

Alternatively, the action 214 may be performed by detecting voice activity or estimating speech presence probability (SPP). Audio levels during periods of non-voice activity or presence may be assumed to represent noise.

Similar actions are performed with respect to the estimated echo 204. An action 218 comprises converting the estimated echo 204 to the frequency domain by calculating a frequency-domain representation of the estimated echo 204. This may comprise receiving input samples of the estimated echo signal 204, arranging them in frames, and calculating a complex echo frequency spectrum 220 for each frame. The echo frequency spectrum 220 may be calculated using overlapping, Hanning windowing and an FFT. Each echo frequency spectrum 220 indicates real and imaginary signal components. Each echo frequency spectrum 220 has values corresponding respectively to multiple discrete frequencies, corresponding to the frequency bins or bands of the signal frequency spectrum 208.

An action 222 comprises calculating an echo PSD 224 based on the complex echo frequency spectrum 220. The echo PSD 224 corresponding to a particular echo frame indicates the signal power or energy of the frame over a range of frequency values. The echo PSD 224 comprises a value for each of multiple frequency values or bins, based on the complex echo frequency spectrum 220. Power for an individual frequency may be calculated as $I^2+R^2$, where I is the imaginary (phase-related) part of the echo frequency spectrum 220 at the corresponding frequency and R is the real (amplitude-related) part of the echo frequency spectrum 220 at the corresponding frequency.

The frequencies at which the values of the echo PSD 224 are calculated correspond to the frequency bins of the echo frequency spectrum 220. In some embodiments the echo PSD 224 may be converted so that each frequency value corresponds to a range or band of frequencies or FFT frequency bins.

The noise PSD 216 and the echo PSD 224 are used in an action 226 of calculating a spectral gain 228. Different alternatives for calculating the spectral gain 228 will be described in more detail below, with reference to FIGS. 3-5. In some cases, the calculation of the spectral gain may also be based on whether the estimated echo represents far-end audio or near-end audio, as indicated by an echo source value 230.

An action 232 comprises applying the spectral gain 228 to the frequency spectrum 208 of the audio signal 202, or adjusting the values of the frequency spectrum 208 in accordance with the corresponding gain values of the spectral gain 228. This results in a filtered frequency spectrum 234. The action 232 may comprise multiplying values of the spectral gain 228 with the frequency-corresponding values of the signal frequency spectrum 208.

A subsequent action 236 comprises computing or reconstructing a time-domain frame from the filtered signal frequency spectrum 234, using a combination of inverse FFT (IFFT) and overlap-and-add methodologies. This results a time-domain output audio signal 238, which may be used as the input audio signal $Tx_3$ of FIG. 1.

As mentioned, the complex spectrums and/or PSDs described with reference to FIG. 2 may be converted from FFT frequency bins to frequency bands of certain frequency ranges. For example, a PSD value for a range of frequencies may be calculated as the average of the power values of the frequencies or bins encompassed by the range. As a more specific example, PSDs may originally have values corresponding to 128 discrete frequencies or bins for a 256-point FFT, which may be converted to a smaller number of frequency bands, such as 30 bands. Each band may correspond to a different band or range of frequencies. In some embodiments, higher frequency ranges may encompass larger numbers of FFT frequency bins than lower frequency ranges.

Figure 3:
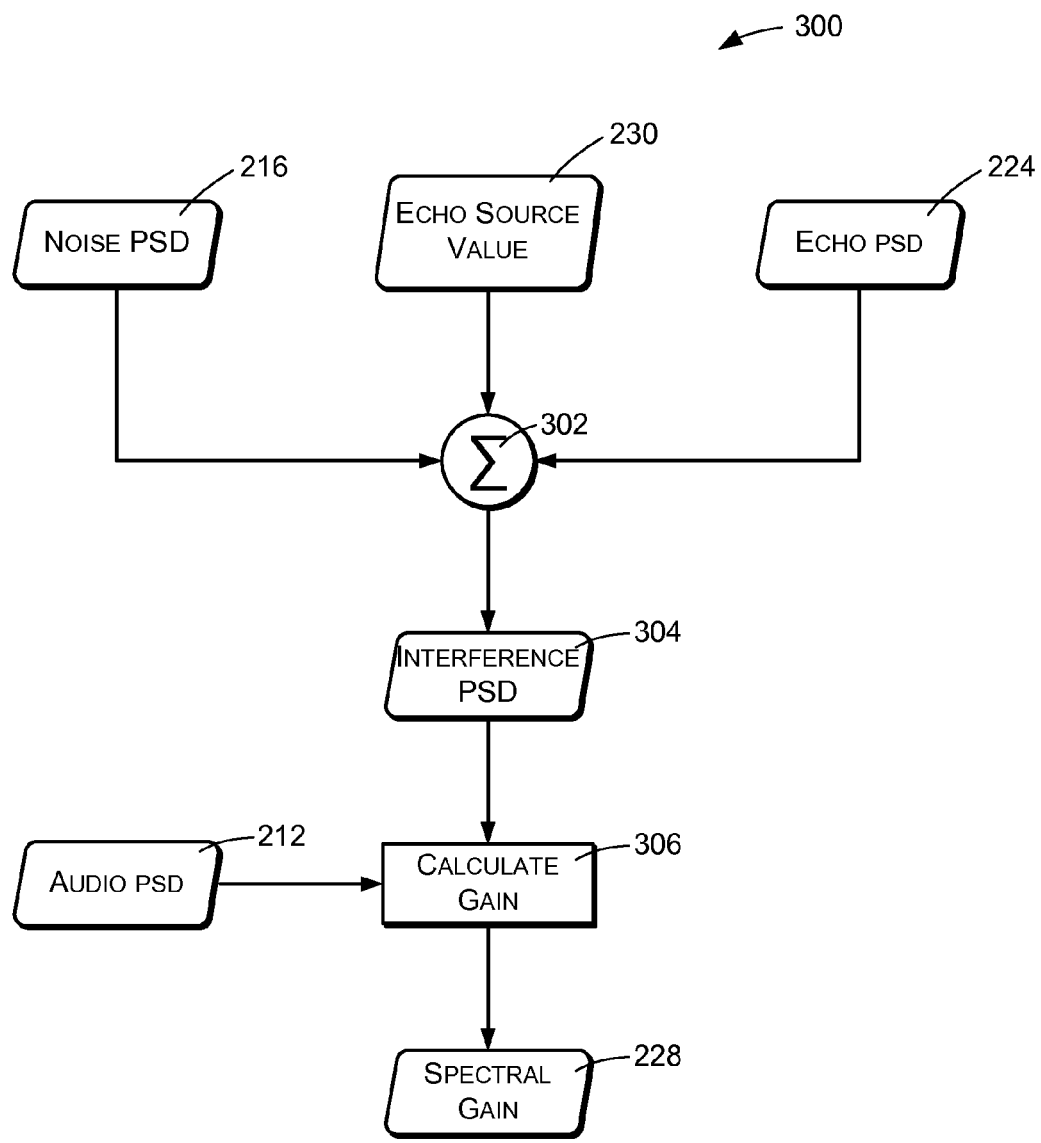
FIGS. 3-5 are flowcharts illustrating techniques for performing simultaneous noise and echo reduction in the frequency domain, which may be implemented in conjunction with the actions of FIG. 2.

FIG. 3 shows an example process 300 for calculating the spectral gain 228, based on the estimated noise PSD 216, the echo PSD 224, and an echo source value 230. The echo source value 230 indicates the relative contributions of near-end audio and far-end audio to the summation 302 that is performed when calculating the spectral gain 228. In particular, the summation 302 is performed as a weighted summation that produces an intermediate PSD referred to herein as an interference PSD 304. The interference PSD is calculated as follows, with respect to each value of the noise PSD and the echo PSD:

interference_PSD=α*noise_PSD+(1−α)*echo_PSD, where α is the echo source value 230, which ranges from 0.0 to 1.0 to indicate the relative contribution of far-end echo relative to near-end talk. When there is no far-end echo, α is set as 1.0, and the interference PSD 304 is the result primarily of the noise estimate of the near-end environment. When there is primarily far-end single talk, α is set as 0.0, and the interference PSD 304 is the result primarily of far-end echo. When there is double talk, with equal contributions of near-end talk and far-end talk, α is set as 0.5. Thus, the spectral gain and estimated noise components are summed in proportion to the echo source value.

In some implementations, the adaptive filter 124 determines the value of α. Alternatively, α may be determined on the basis of the echo return loss enhancement (ERLE), i.e., the energy difference between $Tx_1$ and $Tx_2$. Larger ERLE values correspond to smaller values of α.

An action 306 comprises calculating the spectral gain based on the interference PSD 304, as follows:

ratio=audio_PSD/interference PSD; and spectral_gain=ratio/(ratio+1).

Note that (1−α) is an indication of near-end talk relative to far-end echo.

Figure 4:
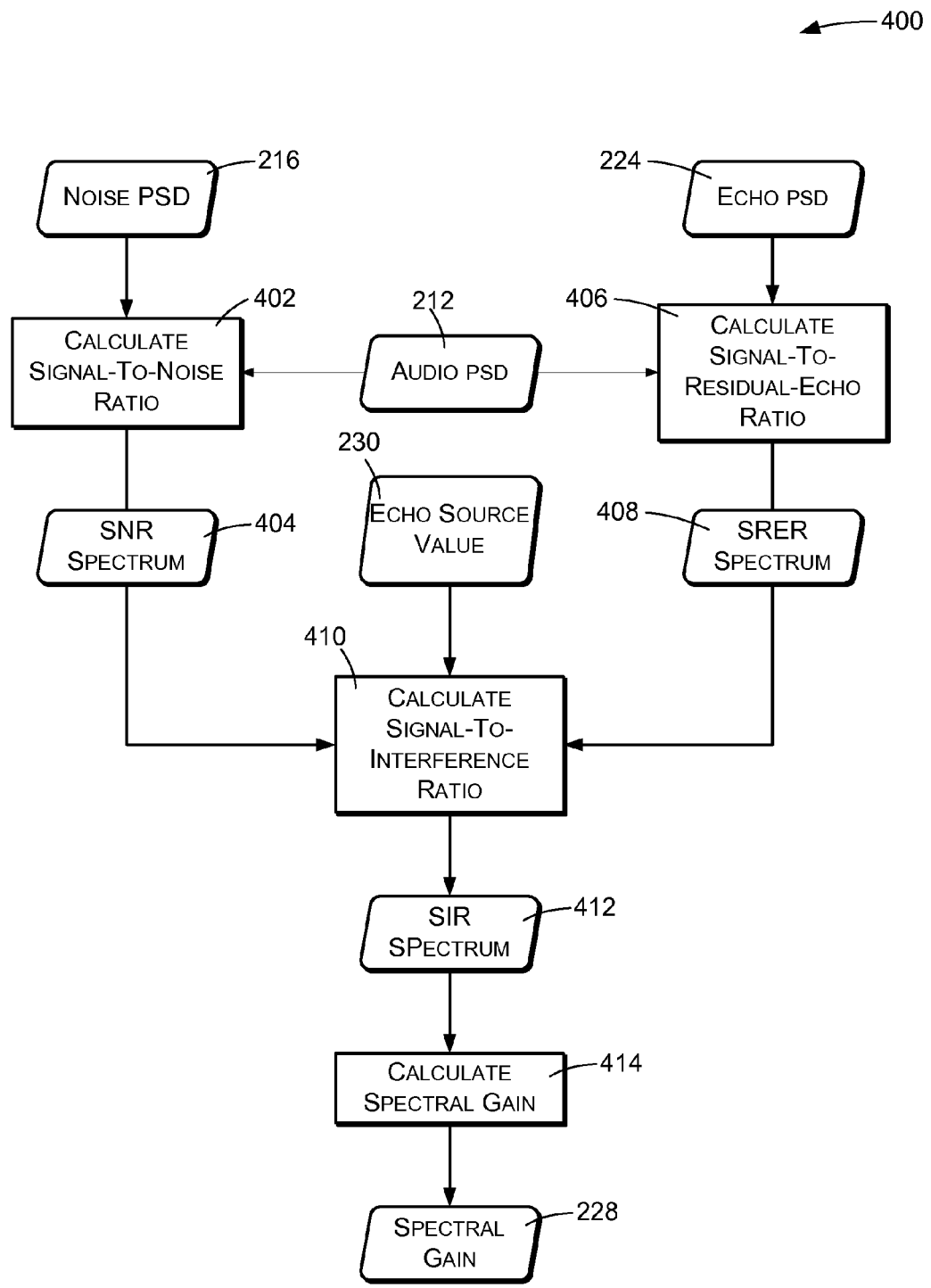

FIG. 4 shows an alternative process 400 for calculating the spectral gain 228. In this example, the spectral gain is based on the noise PSD 216, the echo PSD 224, and the audio PSD 212.

An action 402 comprises calculating a signal-to-noise or signal-to-noise ratio (SNR) spectrum 404, based on the noise PSD 216 and the audio PSD 212. The SNR spectrum 404 comprises signal-to-noise values corresponding respectively to each frequency, bin, or band of the noise PSD 216 and audio PSD 212. At each frequency, bin, or band, the SNR spectrum 404 indicates the ratio of the value of the audio PSD 212 to the value of the noise PSD 216.

An action 406 comprises calculating a signal-to-residual-echo or signal-to-residual-echo ratio (SRER) spectrum 408. The SRER spectrum 408 comprises signal-to-echo values corresponding respectively to each frequency, bin, or band of the echo PSD 224 and the audio PSD 212. At each frequency, bin, or band, the SRER spectrum 408 indicates the ratio of the value of the audio PSD 212 to the value of the echo PSD 224.

An action 410 comprises calculating a signal-to-interference or signal-to-interference ratio (SIR) spectrum 412, based on the SNR spectrum 404 and/or the SRER spectrum 408. The SIR spectrum 412 comprises values corresponding respectively to each frequency, bin, or band of the various PSDs. The SIR spectrum 412 may be calculated in different ways, depending on the nature of the echo detected and estimated by the adaptive AEC 122. If the echo represents single far-end talk, each SIR value may be calculated as being equal to the frequency-corresponding value of the SRER spectrum 408. If the echo represents single near-end talk, each SIR value may be calculated as being equal to the corresponding value of the SNR spectrum 404. If the echo represents both far-end and near-end talk, each SIR value may be calculated as the weighted summation of the SNR spectrum 404 and the SRER spectrum 408, where the weighting is performed as described as follows:

SIR_spectrum=α*SNR_spectrum+(1−α)*SRER_spectrum.

An action 414 comprises calculating the spectral gain 228 based on the SIR spectrum 412. An example of the spectral gain calculation is as follows:

spectral_gain=SIR_spectrum/(SIR_spectrum+1).

The spectral gain calculated in this manner may also be smoothed or averaged over time.

Figure 5:
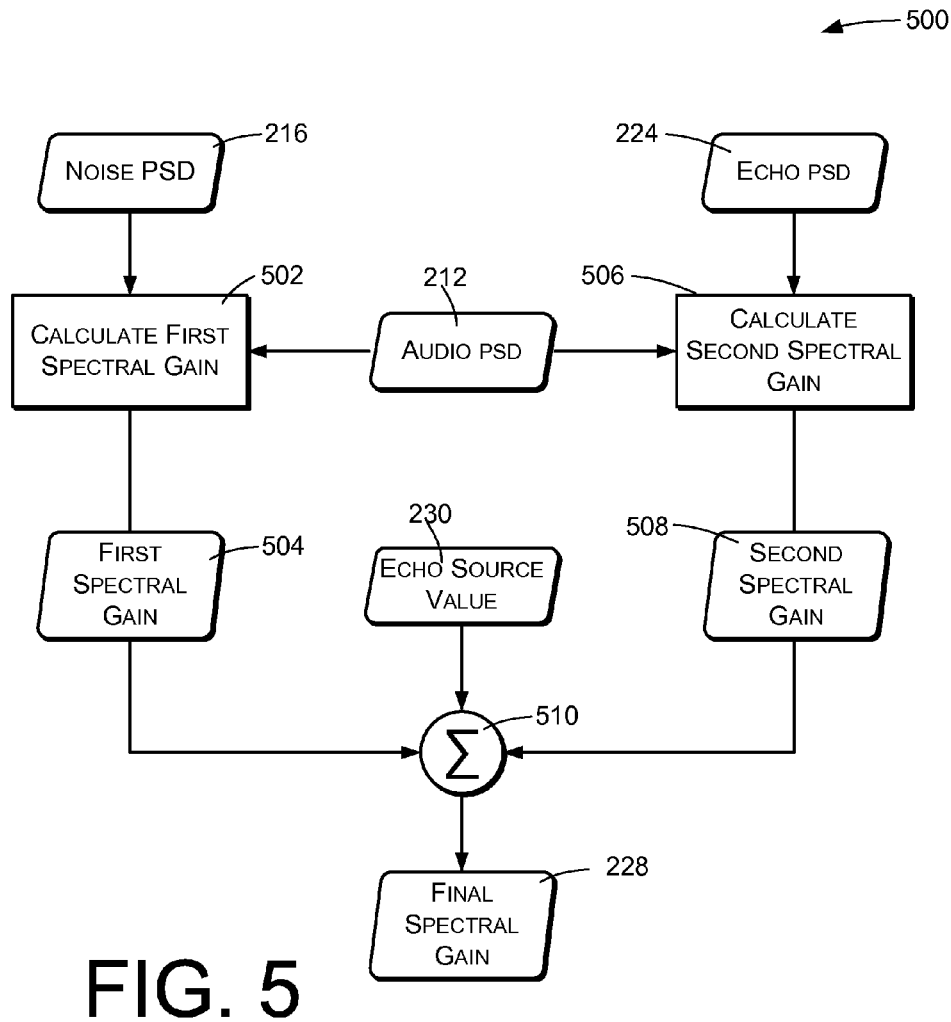

FIG. 5 shows another alternative process 500 for calculating the spectral gain 228. In this example, the spectral gain is based on the noise PSD 216, the echo PSD 224, and the audio PSD 212.

An action 502 comprises calculating a first spectral gain 504, based on the noise PSD 216 and the audio PSD 212. An action 506 comprises calculating a second spectral gain 508, based on the echo PSD 224 and the audio PSD 212. The first spectral gain may be calculated as follows:

ratio=audio_PSD/noise_PSD; and gain=ratio/(ratio+1).

The second spectral gain may be calculated as follows:

ratio=audio_PSD/echo_PSD; and gain=ratio/(ratio+1).

An action 510 comprises summing the first and second spectral gains 504 and 508 to produce a final spectral gain, which forms the spectral gain 228. The summation 510 may be weighted and performed proportionally as described above, in response to the relative contributions of near-end and far-end talk to total interference in the echo-suppressed audio signal.

As an alternative, the final spectral gain 228 may be calculated as the product of the first and second spectral gains 504 and 508, smoothed or averaged over time.

Figure 6:
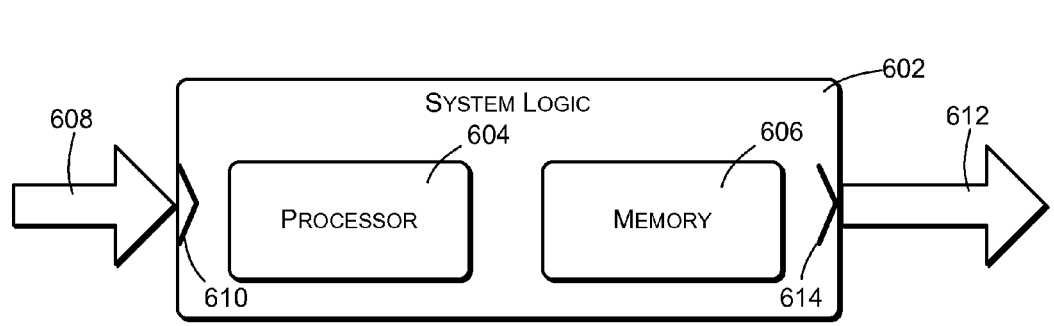
FIG. 6 is a block diagram of a system that may be used to apply echo and noise reduction in accordance with the techniques described with reference to FIGS. 1-5.

FIG. 6 shows an example of an audio system, element, or component 600 that may be used to perform automatic noise and echo reduction. The audio system 600 comprises system logic 602, which in some embodiments may comprise a programmable device or system formed by a processor 604, associated memory 606, and other related components. The processor 604 may be a digital processor, a signal processor, or similar type of device that performs operations based on instructions and/or programs stored in the memory 606. In other embodiments, the functionality attributed herein to the system logic 602 may be performed by other means, including non-programmable elements such as analog components, discrete logic elements, and so forth.

The system logic 602 is configured to implement the functionality described above. Generally, the system 600 receives input audio signal 608, such as the receive signal $Rx_{in}$ and the transmission signal $Tx_{in}$, at an input port 610 and processes the input signal 608 to produce an output signal 612 at an output port 614. The input and output signals may comprise analog or digital signals, and may represent audio in any of various different formats.

The techniques described above are assumed in the given examples to be implemented in the general context of computer-executable instructions or software, such as program modules, that are stored in the memory 606 and executed by the processor 604. Generally, program modules include routines, programs, objects, components, data structures, etc., and define operating logic for performing particular tasks or implement particular abstract data types. The memory 606 may comprise computer storage media and may include volatile and nonvolatile memory. The memory 606 may include, but is not limited to, RAM, ROM, EEPROM, flash memory, or other memory technology, or any other medium which can be used to store media items or applications and data which can be accessed by the system logic 602. Software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Although the discussion above sets forth an example implementation of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing device, comprising:
a processor;
a microphone;
a speaker configured to render audio based at least in part on an output audio signal; and
memory, accessible by the processor and storing instructions that are executable by the processor to perform acts comprising:
receiving an input audio signal from the microphone, wherein the input audio signal includes an echo component resulting from the rendered audio;
estimating an echo signal corresponding to the echo component of the input audio signal based at least in part on the output audio signal;
subtracting the estimated echo signal from the input audio signal to produce an echo-suppressed audio signal;
calculating a frequency-domain representation of the echo-suppressed audio signal;
calculating a frequency-domain representation of the estimated echo signal;
estimating noise values corresponding to different frequencies of the echo-suppressed audio signal based at least in part on the calculated frequency-domain representation of the echo-suppressed audio signal;
calculating gain values corresponding respectively to the different frequencies based at least in part on (a) the estimated noise values of the echo-suppressed audio signal and (b) the calculated frequency-domain representation of the estimated echo signal;
adjusting the frequency-domain representation of the echo-suppressed audio signal at the different frequencies in accordance with the calculated gain values corresponding to the different frequencies to produce an adjusted frequency-domain representation of the echo-suppressed audio signal; and
producing a processed audio signal based at least in part on the adjusted frequency-domain representation of the echo-suppressed audio signal.

2. The computing device of claim 1, the acts further comprising:
calculating signal-to-noise values corresponding respectively to the different frequencies based at least in part on the calculated frequency-domain representation of the echo-suppressed audio signal and the estimated noise values of the echo-suppressed audio signal;
calculating signal-to-echo values corresponding respectively to the different frequencies based at least in part on the calculated frequency-domain representation of the estimated echo signal and the calculated frequency-domain representation of the echo-suppressed audio signal; and wherein calculating the gain values is based at least in part on (a) the calculated signal-to-noise values and (b) the calculated signal-to-echo values.

3. The computing device of claim 1, wherein calculating the gain values comprises:
   calculating a first set of gain values corresponding respectively to the different frequencies based at least in part on the estimated noise values and the calculated frequency-domain representation of the echo-suppressed audio signal;
   calculating a second set of gain values corresponding respectively to the different frequencies based at least in part on the calculated frequency-domain representation of the estimated echo signal and the calculated frequency-domain representation of the echo-suppressed audio signal; and
   summing the first and second sets of gain values at each of the different frequencies.

4. The computing device of claim 1, wherein estimating the echo signal comprises filtering the output audio signal with an adaptive finite impulse response filter, wherein the adaptive finite impulse response filter has filter coefficients that are dynamically adjusted based at least in part on the echo-suppressed audio signal.

5. The computing device of claim 1, wherein:
   the calculated frequency-domain representation of the echo-suppressed audio signal indicates values of the echo-suppressed audio signal corresponding to the different frequencies; and
   the calculated frequency-domain representation of the estimated echo signal indicates values of the estimated audio signal corresponding respectively to the different frequencies.

6. A method, comprising:
   estimating an echo signal corresponding to an echo component of an input audio signal;
   subtracting the estimated echo signal from the input audio signal to produce an echo-suppressed audio signal;
   calculating a frequency-domain representation of the echo-suppressed audio signal;
   calculating a frequency-domain representation of the estimated echo signal;
   estimating noise values corresponding to different frequencies of the echo-suppressed audio signal based at least in part on the calculated frequency-domain representation of the echo-suppressed audio signal;
   calculating gain values corresponding respectively to the different frequencies based at least in part on (a) the estimated noise values of the echo-suppressed audio signal and (b) the calculated frequency-domain representation of the estimated echo;
   processing the frequency-domain representation of the echo-suppressed audio signal at the different frequencies in accordance with the calculated gain values to reduce noise and residual echo components of the echo-suppressed audio signal; and
   producing a transmit audio signal based at least in part on the processed frequency-domain representation of the echo-suppressed audio signal.

7. The method of claim 6, wherein estimating the echo signal comprises filtering a received output audio signal with an adaptive finite impulse response filter, wherein the adaptive finite impulse response filter has filter coefficients that are dynamically adjusted based at least in part on the echo-suppressed audio signal.

8. The method of claim 6, wherein:
   the frequency-domain representation of the estimated echo comprises echo values corresponding respectively to the different frequencies; and
   calculating the gain values comprises summing the estimated noise values and the echo values in proportion to relative contributions of near-end audio and far-end audio to interference in the echo-suppressed audio signal.

9. The method of claim 6, wherein the processing comprises:
   calculating signal-to-noise values corresponding respectively to the different frequencies based at least in part on the calculated frequency-domain representation of the echo-suppressed audio signal and the estimated noise values of the echo-suppressed audio signal; and
   calculating signal-to-echo values corresponding respectively to the different frequencies based at least in part on the calculated frequency-domain representation of the estimated echo signal and the calculated frequency-domain representation of the echo-suppressed audio signal;
   wherein the calculating gain values corresponding respectively to the different frequencies is further based at least in part on (a) the calculated signal-to-noise values and (b) the calculated signal-to-echo values.

10. The method of claim 9, wherein calculating the gain values comprises summing the calculated signal-to-noise values and the calculated signal-to-echo values at each of the different frequencies in proportion to relative contributions of near-end and far-end audio to interference in the echo-suppressed audio signal.

11. The method of claim 6, wherein calculating the gain values comprises:
   calculating a first set of gain values corresponding respectively to the different frequencies based at least in part on the estimated noise values and the calculated frequency-domain representation of the echo-suppressed audio signal; and
   calculating a second set of gain values corresponding respectively to the different frequencies based at least in part on the calculated frequency-domain representation of the estimated echo signal and the calculated frequency-domain representation of the echo-suppressed audio signal.

12. The method of claim 11, wherein calculating the gain values comprises summing the first and second sets of gain values at each of the different frequencies based in proportion to relative contributions of near-end and far-end audio to interference in the echo-suppressed audio signal.

13. One or more non-transitory computer-readable media storing computer-executable instructions that, when executed by one or more processors, cause the one or more processors to perform acts comprising:
   processing an audio signal by linear adaptive filtering to reduce an echo component of the audio signal; and
   processing the audio signal in a frequency domain by applying gain values to a frequency-domain representation of the audio signal, wherein the gain values are based at least in part noise components of the audio signal over a spectrum of frequencies and estimated echo values of the audio signal over the spectrum of frequencies, the processing the audio signals in the frequency domain to (a) reduce noise in the audio signal and (b) further reduce the echo component in the audio signal.

14. The one or more non-transitory computer-readable media of claim 13, wherein processing the audio signal comprises:
  applying an adaptive filter to the audio signal to estimate the echo component; and
  subtracting the echo component from the audio signal.

15. The one or more non-transitory computer-readable media of claim 13, wherein processing the audio signal in the frequency domain is based at least in part on estimating noise components of the audio signal over a spectrum of frequencies.

16. The one or more non-transitory computer-readable media of claim 13, wherein processing the audio signal in the frequency domain is based at least in part on evaluating power values of the audio signal over a spectrum of frequencies.

17. The one or more non-transitory computer-readable media of claim 13, wherein processing the audio signal in the frequency domain is based at least in part on estimating values of the echo component over a spectrum of frequencies.

18. The one or more non-transitory computer-readable media of claim 13, wherein processing the audio signal in the frequency domain is based at least in part on evaluating noise-to-signal values of the audio signal over a spectrum of frequencies.

19. The one or more non-transitory computer-readable media of claim 13, wherein processing the audio signal in the frequency domain is based at least in part on evaluating signal-to-echo values of the audio signal and the echo component over a spectrum of frequencies.

* * * * *